Patented June 18, 1935

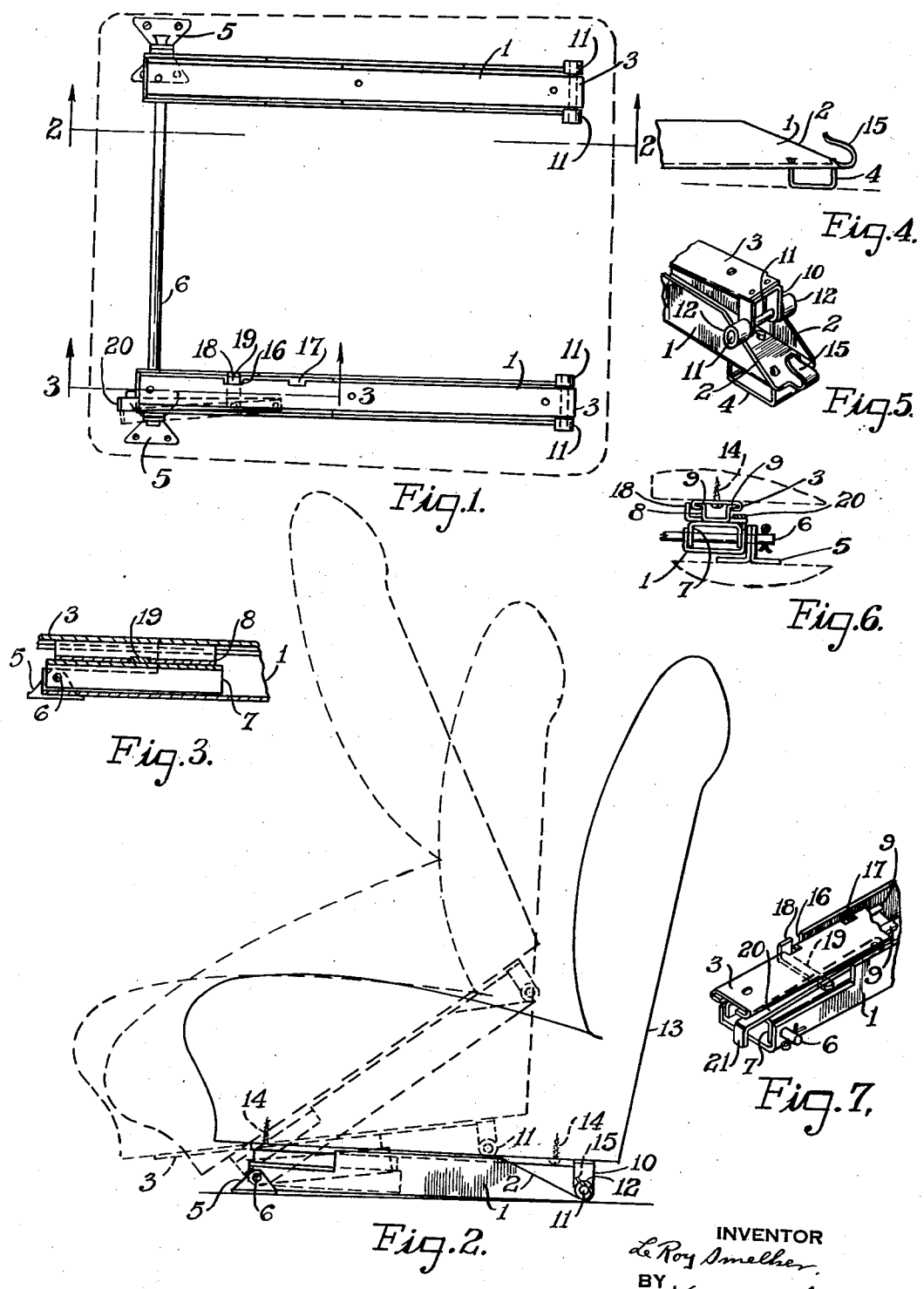

2,005,112

UNITED STATES PATENT OFFICE 2,005,112

VEHICLE SEAT

Le Roy Smelker, Dayton, Ohio, assignor to The Dayton Accessories Manufacturing Company, Dayton, Ohio, a corporation of Ohio Application September 20, 1934, Serial No. 744,805

5 Claims. (Cl. 155—5)

This invention relates to new and useful improvements in vehicle seats.

It is one of the principal objects of this invention to provide for a vehicle body of the divided, two-door type, a seat adjacent the driver's seat that may be easily moved forward and tilted by the occupant, without the use of hand-actuated means, to increase the clearance between it and the door post to facilitate the passage of a person to and from the rear seat. A shifting movement of the body alone is sufficient to achieve this result.

Another object of my invention is to provide means for locking the seat in its normal, or a partially advanced position.

Other important and incidental objects will be brought out in the following specification, and particularly set forth in the subjoined claims.

In the accompanying drawing illustrating my invention, Figure 1 is a bottom plan view of a front vehicle seat to which my seat sliding means have been applied. Figure 2 is a sectional view taken through that seat on the line 2—2 of Figure 1, showing in one dotted line position how it may be tilted from a normal state, and in a second dotted line position how it may be moved forward and inclined when occupied to increase clearance between it and the door post of the vehicle. Figure 3 is a sectional view taken on the line 3—3 of Figure 1, showing the seat sliding and tilting means. Figure 4 is a side view of the rear end of one of the channel rails, showing the elevating member in place thereon. Figure 5 is a perspective view of the rear end of one of the channel rails, showing the roller end of a respective carriage member partly elevated on the inclined portion of a channel rail. Figure 6 is a front view of the right hand channel rail, showing how a respective carriage member is pivotally secured thereto. And Figure 7 is a perspective view of the front end of one of the channel rail assemblies, showing the locking means for the shiftable seat.

Referring to the accompanying drawing for a detailed description of my invention, the numerals 1, 1 designate two channel rails whose sides taper downwardly at their rear ends to form inclined surfaces 2 to raise the rear ends of respective metal carriage members 3, 3. There are preferably two channel rails 1, 1, both of which rest at their rear ends upon the floor of the vehicle in Figure 1. If it is desired to raise the rear end of each track a desired distance above the floor, it may be done by securing thereto the U-shaped elevating leg 4 of the desired height, one of said legs being illustrated in Figure 4.

Secured to the floor of the vehicle are two widely spaced pairs 5, 5 of bracket clips that support the ends of a transverse pivot rod 6. Pivotally mounted upon this rod are the front ends of the channel rails 1, 1. Also pivotally secured to the rod 6, within the front end of each channel rail 1, is the front end of a short inverted channel member 7 to which a narrow channel member 8 of substantially equal length is riveted. (See Figure 6.)

The sides of the channel member 8 terminate in horizontal flanges 9, 9 that enter grooves which are formed by bending over the edges of a respective metal carriage member 3, whereby the latter may have a guided, longitudinal movement over the channel member.

Secured to the rear end of each carriage member 3 is an invered U-shaped support 10 for a cross shaft 11 which carries near its flanged ends rollers 12, 12. These rollers are adapted to ride up the inclined portions 2, 2 of the rails 1, 1, and along the top edges of the latter, to elevate and advance a front vehicle seat 13 to the bottom of which the carriage members 3, 3 are secured by screws 14. The channel rails 1, 1 terminate at their rear ends in hook portions 15 that receive the shafts 11 carried by their respective carriage members 3, 3, to limit the rearward movement of them.

The seat 13 is shifted from its full line position to its advanced dotted line position in Figure 2 by a simple forward movement of the body of the occupant, the rear rollers 12, 12 first riding up the inclined portions 2 of the channel rails 1, 1 to elevate the rear portion of the seat while it moves forward, after which these rollers move over the top edges of the channel members to advance the seat still further. When unoccupied, the seat may be tilted by moving it about the pivot rod 6 to its intermediate dotted line position in Figure 2.

It may be desirable to lock the seat 13 in its normal position, or in its partially advanced position upon the rails 1, 1. For this purpose I have provided in the right-hand carriage member 3, near its front end, two spaced notches 16 and 17. Adapted to enter either one of these notches is the upturned end 18 of a locking member 19. The latter is transversely movable through notches formed in the sides of the narrow channel member 8, being pivotally secured beyond said member to an actuating arm 20. (See Figures 1 and 7). This arm is so pivoted at its rear end to the top portion of the inverted channel member 7 as to have a free swinging movement over the latter. The channel member 1 is cut away opposite said arm so as not to interfere with the outward movement of its front end, which is bent downwardly beyond said rail to provide a grip portion 21.

When the seat 13 is in its normal full line position in Figure 2, the notch 16 in the right-hand carriage member 3 will be in a position to receive the projecting end 18 of the locking member 19 when the arm 20 is moved to the right in Figure 7, to lock the seat against forward movement. In a partially advanced position of the seat the upturned end 18 of the locking member 19 may be drawn into the notch 17 of the carriage member 3 by the arm 20, to lock the seat in that position.

It is thus seen that I have provided a front vehicle seat which may not only be elevated and shifted forwardly by the movement of the body of the occupant, without the assistance of hand-actuated devices, but which may be locked in either its normal, of a partially advanced position. The track and carriage mechanism for achieving this result is simple, and may be easily applied to any front vehicle seat of the divided type to afford an adequate clearance between it and the vehicle post for the entrance and egress of back seat occupants.

Having described my invention, I claim:

1. The combination with a vehicle seat, of a rail adapted to rest on the floor of the vehicle and having a downwardly inclined rear end, a track member pivotally secured to the front end of the rail, a carriage member secured to the bottom of said seat and longitudinally slidable over the track member, and roller means carried by the rear end of the carriage member for rolling contact with the inclined rear end of the rail to raise the rear end of the seat while it is being shifted forwardly by the occupant.

2. The combination with a vehicle seat, of a channel rail pivoted at its front end to the floor of the vehicle, the sides of said channel rail sloping downwardly in unison at their rear ends, a track member pivotally secured at its front end within the front end of the channel rail, a carriage member secured to the bottom of said seat and longitudinally slidable over the track member, and rollers carried by the rear end of the carriage member for rolling contact with the inclined rear portions of the sides of the channel rail to raise the rear end of the seat while it is being shifted forwardly by the occupant.

3. The combination with a vehicle seat, of a pair of channel rails pivoted at their front ends to the floor of the vehicle, the sides of said channel rails inclining downwardly in unison at their rear ends, carriage supporting members pivotally secured at their front ends within the channel rails, a carriage member slidable longitudinally over the top of each carriage supporting member, a seat to whose bottom portion said carriage members are secured, a roller support depending from the rear end of each carriage member, and rollers carried by said supports for rolling contact with the inclined rear portions of the sides of the channel rails to raise the rear end of the seat while it is being shifted forwardly by the occupant.

4. The combination with a vehicle seat, of a rail adapted to rest on the floor of the vehicle and having a downwardly inclined rear end, a track member pivotally secured to the front end of the rail, a carriage member secured to the bottom of said seat and longitudinally slidable over the track member, a transverse shaft carried by the rear end of the carriage member, roller means on said shaft for rolling contact with the inclined rear end of the rail to raise the rear end of the seat while it is being shifted forwardly by the occupant, and a hook on the rear end of the carriage member to receive said roller shaft.

5. The combination with a vehicle seat, of a rail pivotally secured at its front end to the floor of the vehicle and having a downwardly inclined rear end, a track member pivotally secured to the front end of the rail, a carriage member longitudinally slidable over the track member, roller means carried by the rear end of the carriage member for rolling contact with the inclined rear end of the rail to elevate the rear end of the seat while it is being shifted forwardly by the occupant, said carriage member being formed with spaced notches in one of its sides, and a locking member transversely movable under the carriage member, having an upturned end adapted to enter one or the other of said notches in the sides of the carriage member to lock said carriage member in its normal rear position or in a partly advanced, elevated position.

LE ROY SMELKER.